United States Patent

Plate et al.

[11] Patent Number: 5,114,740
[45] Date of Patent: May 19, 1992

[54] METHOD AND APPARATUS FOR PROVIDING ANTISTATIC PROTECTION TO PLASTIC LENSES

[75] Inventors: Richard W. Plate, Brooklyn; Mark J. Gresser, Ypsilanti, both of Mich.

[73] Assignee: Ford Motor Company, Dearborn, Mich.

[21] Appl. No.: 297,457

[22] Filed: Jan. 13, 1989

[51] Int. Cl.$^5$ .................. B05D 3/06; B05D 5/06
[52] U.S. Cl. .................. 427/40; 427/164; 427/322; 427/393.5; 427/421; 118/50.1; 118/313; 118/630; 118/634; 118/668; 118/676
[58] Field of Search .................. 427/40, 164, 393.5, 427/322, 421; 118/629, 324, 634, 630, 50.1, 313, 668, 676

[56] References Cited

U.S. PATENT DOCUMENTS

| | | | |
|---|---|---|---|
| 4,478,873 | 10/1984 | Masso et al. | 427/164 |
| 4,526,832 | 7/1985 | Burnett et al. | 428/336 |
| 4,815,962 | 3/1989 | Cardone | 427/164 |
| 4,836,137 | 6/1989 | Heine et al. | 118/50.1 |

OTHER PUBLICATIONS

K. Johnson, *Antistatic Agents*, Technology and Applications, Noyes Data Corporation, Park Ridge, NJ (1972).

*Primary Examiner*—Janyce Bell
*Attorney, Agent, or Firm*—Charles H. Ellerbrock; Roger L. May

[57] ABSTRACT

A process and apparatus are disclosed for providing antistatic protection to a plastic lens, the apparatus being adapted to carry out the process and comprising:
  (A) deionizing means for providing a flow of ionized air to at least a major surface of the lens;
  (B) an airless spray system for applying a thin, substantially uniform coating of liquid antistatic material onto the lens surface following its deionization.

A decay chamber may be provided for at least partially isolating the lens from airborne contaminants as the antistatic material dries.

19 Claims, 1 Drawing Sheet

METHOD AND APPARATUS FOR PROVIDING ANTISTATIC PROTECTION TO PLASTIC LENSES

INTRODUCTION

The present invention relates generally to providing anti-static protection to the surface of plastic lenses. More particularly, the invention relates to a method and apparatus for decontaminating the surface of the plastic lens and applying a coating of antistatic agent to reduce recontamination.

BACKGROUND OF THE INVENTION

In the manufacture and assembly of articles incorporating plastic lenses, for example lenses made of acrylic, polycarbonate, etc., such as in the manufacture and assembly of motor vehicle instrument panels and the like, the lenses often are assembled with other components such that at least one surface of the lens is not readily accessible for cleaning. Attempts generally are made, therefore, to remove lint, dust and like contamination from the surface of the lens before its incorporation into the assembly. Such decontamination of the lens surface can be done by any of several known means including, for example, wiping with a cloth. The surface may become again contaminated, however, as the result of any static charge on the surface of the part. Such static charge will develop over time under normal conditions. The static charge will attract contaminants, particularly airborne contaminants, to the lens surface.

Various processes and equipment are known and used to neutralize static charge at specific points on the surface of a work piece, such as ionizers, static bars, grounding brushes, etc. However, non-conducting materials, such as plastic, which typically accumulate large static charges quite readily, often cannot be effectively point discharged. Also, as the part moves through a production or assembly process, it may quickly pick up a static charge again, often only a short time after it has been neutralized. It often is impractical to place numerous grounding or ionizing devices throughout a production process. Also, antistatic protection for a material may be important to the product after it is assembled. None of the above-mentioned devices or methods Provide significant antistatic protection to a part during end use of the assembled product.

Antistatic agents have been used for many years in various industries to reduce static problems during processing and use of plastic parts. They reduce the attraction of dust and dirt to the surface of the part by reducing the static charge on the surface of the part. Antistatic agents may be applied to the surface of the finished article or incorporated into the bulk polymer during processing. They are believed to function generally by decreasing the rate of static charge generation and/or by increasing the rate of charge dissipation. For plastic lenses, the incorporation of an antistatic agent into the bulk polymer of the part has been found in many cases, however, to decrease the transparency or otherwise to adversely affect the optical quality of the lens and for this reason is often an unsuitable approach. The application of an antistatic agent to the surface of a plastic article by dipping, wiping or spraying has been used effectively. For cost effective high volume manufacturing and assembling processes, however, dipping or wiping an antistatic agent onto the plastic part presents several difficulties. These processes tend to be time and cost inefficient and an open bath of antistatic agent can become contaminated over time.

An antistatic agent can be sprayed from a reservoir in a closed container, which will reduce contamination, but significant processing problems are presented. Typically, local plant air is used in the spray system and airborne contaminants may be entrained with the antistatic material and deposited onto the surface of the lens. Also, difficulties can be encountered in controlling the amount of material deposited on the surface of the part and the distribution of the material over the surface of the part. Typically, spray systems have been found unable to produce sufficiently fine atomization of liquid antistatic agent required for a uniform thin film coverage, which is important for preserving the optical qualities of a plastic lens. When an excessively heavy coating is applied, the coating will be slow to dry, may smear upon contact with another surface and may otherwise impair the optical quality of the lens. In addition, it has long been a problem associated with the spraying of antistatic material that the material, even if a suitable amount is applied, does not distribute itself evenly over the surface of the part, being heavily concentrated in certain areas and sparse in others. Insufficient coverage can even result in bare spots, i.e., areas on the lens surface not coated with the antistatic material. Sparsely coated and uncoated areas are found to have unacceptably high static charges. This results in uneven antistatic protection, poor appearance and poor lens optics.

One approach which has been tried for removing the static charge from a plastic lens is the use of a flow of ionized air. Commercial units are available which generate a flow of ionized air which can be used to blow contamination from the surface of a plastic lens and simultaneously deionize the surface. While this method has proven effective, its effects are not long lasting. That is, plastic lenses so treated have been found to have unacceptably high static charge levels within as little as several hours from the time of treatment. Hence, dust, lint and other contamination is attracted to the surface of the lenses during its assembly with other components and during shipment and use of the final product.

Accordingly, there is a need for a method and apparatus for providing a durable antistatic protection to the lens. Preferably, the method and apparatus would be suitable for high volume commercial production applications. These and other objects met by the invention, or in certain cases met by preferred embodiments of the invention, will be better understood in the light of the following disclosure and discussion of the invention.

SUMMARY OF THE INVENTION

According to an apparatus aspect of the invention, an antistatic treatment apparatus for providing antistatic protection to a plastic lens comprises deionizing means for directing a flow of ionized air at the lens and coating means comprising an airless spray system for then applying a coating of liquid antistatic material. In a typical commercial embodiment the apparatus comprises:

(A) deionizing means at a first location in the apparatus for providing a flow of ionized air to at least first major surface of the lens;

(B) coating means at a second location in the apparatus for applying a coating of liquid antistatic material to the part after it leaves the first location, the coating means comprising an airless spray system for spraying the liquid antistatic material onto the lens;

(C) optionally, decay chamber means for at least partially isolating the lens from airborne contaminants for a time period sufficient for the coating to at least substantially dry; and (D) conveyor means for conveying the lens through the apparatus, from the first location to the second location and from there to the decay chamber means (if any).

The decontamination and antistatic treatment for plastic lenses provided by the present invention provides certain innovations and also combines certain features which, for reasons discussed further below, would have been thought redundant and for that reasons incompatible in an efficient and cost effective system by those skilled in the art. The antistatic treatment apparatus in accordance with preferred embodiments of the invention can be arranged as a treatment line, optionally as a mobile unit, positionable adjacent an injection molding apparatus in which the plastic lenses are being made, for immediate processing of the lenses. The invention is found to provide exceptionally good antistatic protection to plastic lenses, such that they remain substantially contamination free for extended periods under normal conditions of product assembly and use.

In accordance with a process aspect of the invention, antistatic protection is provided by first exposing the lens to a directed flow of ionized air followed by applying a coating of liquid antistatic material by an airless spray system. In a typical commercial embodiment the process provides antistatic protection for each in turn of a series of such lenses by:

(A) conveying a first lens to a first location and there exposing at least one major surface of the lens to a flow of ionized air;

(B) subsequently conveying the first lens to a second location and there applying a coating of liquid antistatic material to the first lens by an airless spray system;

(C) in substantial synchrony with step (B) conveying a second lens to the first location and there exposing at least one major surface thereof to the flow of ionized air; and, optionally, (D) conveying each of the lenses in turn into a decay chamber in which it is at least partially isolated from airborne contaminants for a time period sufficient for the coating to at least substantially dry.

As noted above, the present invention combines certain features which would have been thought redundant and hence inappropriate by those skilled in the art for providing antistatic protection to plastic lenses. In particular, the present invention first exposes the plastic lenses to a flow of ionized air. While not wishing to be bound by theory, it presently is understood that a flow of ionized air will deionize the surface of a plastic part and will blow away most or all existing surface contaminants, e.g. dust, lint, etc. Under normal conditions such treatment is capable of leaving the surface of a plastic part substantially free of static charge and for this reason is used by some manufacturers and assemblers of plastic lenses. This treatment provides, however, no protection against the subsequent buildup of a static charge on the surface of a plastic part and, as static charge builds, airborne contaminants can be attracted to the surface. While others have instead used the application of an antistatic coating material to both decharge and also provide continuing antistatic protection, thus overcomming the aforesaid deficiency of deionizing a plastic surface, it has heretofore been unknown to precede an application of liquid antistatic material by treatment with ionized air flow.

Surprisingly, however, these treatments are now found not to be merely redundant in decharging a plastic surface. Rather, it is now found that deionizing the surface of the plastic part prior to application of a coating of liquid antistatic material results in more even distribution of the antistatic material, that is, a more uniform coating is achieved. In this way, there is greater assurance that portions of the surface are not left uncoated or inadequately coated and, in addition, there is reduced tendency of the coating to be excessively heavy over certain areas of the surface. As noted above, a coating which is heavier than necessary is undesirable, since it can affect the optical quality of the lens, requires longer drying time and is more likely to smear.

While not wishing to be bound by theory, it presently is believed that an existing antistatic charge on the surface of the plastic lens may cause, in part, the uneven distribution of liquid antistatic material by attracting and/or repelling the material at certain areas of the surface. In any event, the combined pretreatment with ionized air flow followed by spray application of liquid antistatic material is found to provide adequate antistatic protection without smearing, etc. by applying a very thin and uniform film of antistatic material over substantially the entire surface of the plastic lens. In fact, under optimal conditions a highly desirable "mono-layer" of antistatic material can be achieved in accordance with preferred embodiments of the invention. A so-called "mono-layer" is a surface layer without discontinuities or gaps and which is nominally a single molecule deep after drying.

An additional unique feature of the invention involves the use of an airless spray system to apply the liquid antistatic material. It has been known previously to use spray systems in which air is used as a carrier for a liquid antistatic material. Such air, however, typically is drawn from the surrounding atmosphere and, hence, usually carries airborne contaminants. These contaminants can deposit and remain on the surface of a part being treated. In the present invention, in contrast, pressurized air is not used as a carrier for the liquid anistatic material and, hence, airborne contamination in the surrounding atmosphere is not sent through the spray system to deposit on the lens.

In addition, the use of an airless spray system, various suitable models of which are commercially available and well known for other applications, can be operated at very high pressure, thereby providing better control over both delivery rate and distribution of the spray plus finer particle size and increased delivery rates. This, in turn, allows the use of lower concentrations of liquid antistatic material, which typically comprises an aqueous solution, thereby further facilitating a thinner and more uniform film. A not insignificant additional benefit is the reduction in material waste achieved by the better controlled spray application of the antistatic material.

These and additional features and advantages of the invention will be better understood from the following discussion and detailed description of certain preferred embodiments thereof.

BRIEF DESCRIPTION OF THE DRAWING

The drawing schematically illustrates apparatus in accordance with a preferred embodiment of the invention. It is adapted to carry out a preferred embodiment of the process of the invention. Specifically, the drawing schematically illustrates an antistatic treatment line for providing antistatic protection to plastic lenses at commercial production rates typical for manufacture and assembly of motor vehicle instrument panels into which the plastic lenses are to be assembled.

DETAILED DESCRIPTION OF PREFERRED EMBODIMENTS

Figure 1:
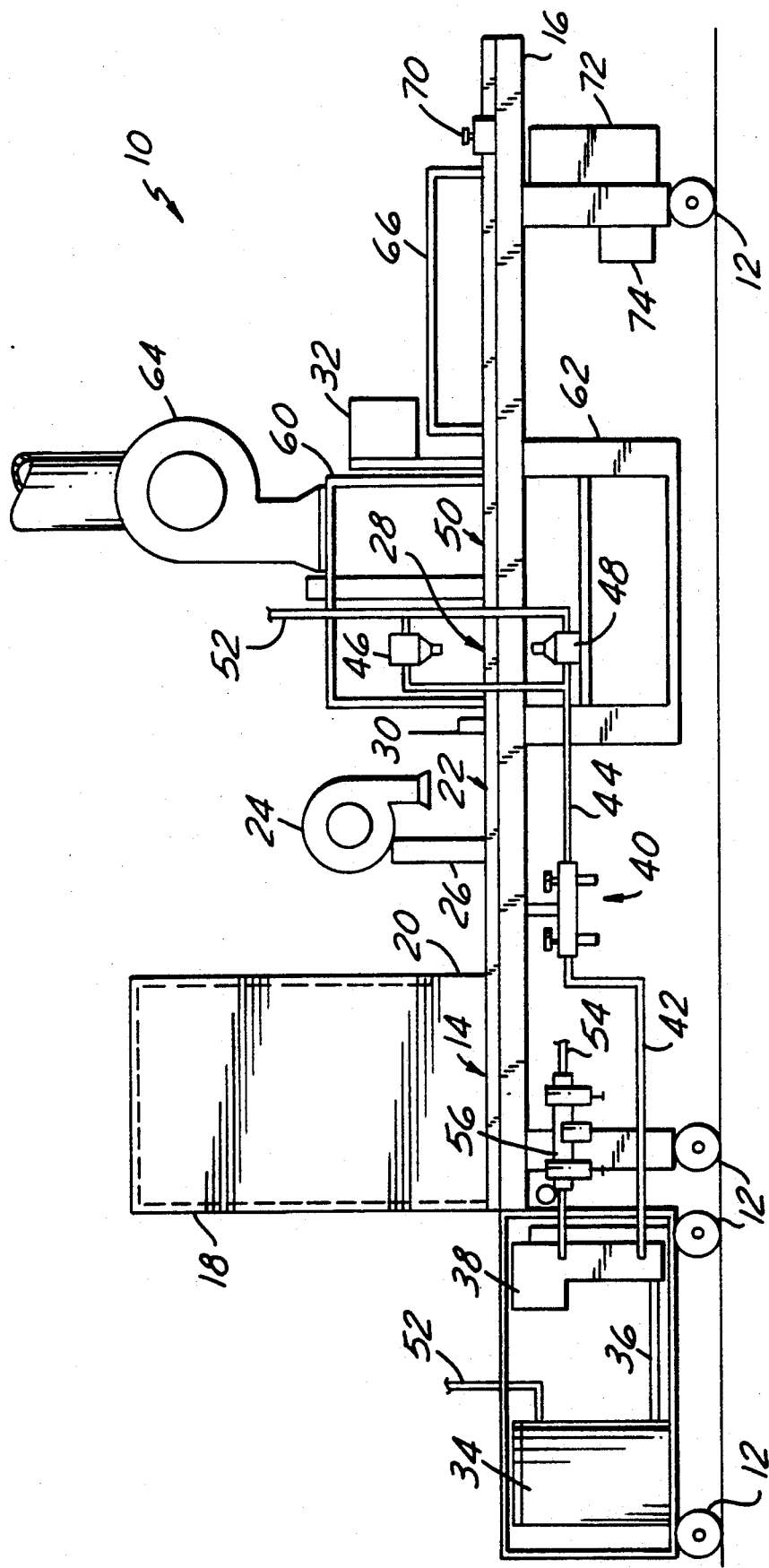

The apparatus now described is referred to in some instances as an antistatic treatment line. It should be understood that this line can be incorporated into a larger processing line, for example, a manufacturing line including injection molding or other molding equipment for fabrication of the plastic lens. The overall manufacturing line may further include other treatment steps and the assembly of the lens with other components.

Referring now to the drawing, antistatic treatment apparatus 10 is seen to be a substantially self-contained mobile unit mounted on wheels 12. As such, it can be rolled into position as an integrated part of a larger manufacturing or assembly line. For purposes of the following discussion, it will be assumed that apparatus 10 is positioned adjacent an injection molding machine (not shown) in which plastic lenses are being made, and that automatic transfer means, such as any suitable robot transfer arm, is transferring the lenses from the injection molding machine as they are made to the beginning location 14 of conveyor 16 described further below. Such robot transfer arm (not shown) serves merely as an automatic part unloader from the injection molding tool and may be any of numerous commercially available models such as, for example, those available from Martin Industries. The robot arm could employ suction cups attached to a source of vacuum to pick up the plastic lens, optionally picking up multiple Plastic lenses made simultaneously in the molding tool and depositing them at location 14 for simultaneous treatment by apparatus 10. The robot could be positioned, at least in part, in safety cage 18 positioned over beginning location 14 of the conveyor 16. Safety cage 18 would have an opening at bottom right area 20 through which the plastic lenses would pass on the conveyor for antistatic treatment.

Conveyor 16 comprises a conveyor belt which is not separately shown in drawing for purposes of simplifying the illustration. The belt may be any of numerous commercially available types, preferably of open construction through which liquid antistatic material can be sprayed. Preferably the belt is a wire mesh type such as that available from Wiremation Company, Ohio, but numerous other conveyor belts on which the plastic lenses can ride without scratching or other damage will be apparent to the skilled of the art in view of this disclosure. The upper portion of the conveyor belt travels horizontally from left to right in the drawing.

Lenses passing out of protective cage 18 travel on the conveyor belt to a location 22 directly under deionizing fans 24 mounted on bracket 26. As noted above, the deionizing fans blow ionized air at the plastic lenses to deionize the surface of the lenses. This eliminates static charge and also removes at least most of the contaminants, if any, on the surface of the lenses. Suitable deionizing fans are commercially available and will be apparent to the skilled of the art in view of the present invention. Such fans are available, for example, from Simco Company, Hatfield, Penna. Preferably the conveyor belt moves lenses in step-wise fashion from station to station along the antistatic treatment apparatus 10. Thus, it would move an incremental distance from location 14 to location 22 and then stop a period of time during which the lens or lenses would be exposed to the flow of ionized air from deionizing fans 24. It has been found that a sufficient flow of ionized air against a major surface of a plastic lens frequently is adequate to neutralize static charge on the entire surface of the lens. Nevertheless, it will be readily understood by those skilled in the art in view of this disclosure that additional deionizing fans may be used to create a flow of ionized air against additional surfaces of the lens. Following the predetermined dwell time, the conveyor belt is reactuated, preferably automatically, to move the plastic lenses to location 28 (distances along the conveyor line not necessarily being to scale). As the lenses pass sensor 30, preferably an electric eye of which suitable versions are commercially available, a predetermined delay time is started after which an airless spray system is actuated to coat substantially the entire surface of the lenses with a thin uniform coating of liquid antistatic material, as discussed further below.

Control panel 32, the exact positioning of which is a matter of design choice well within the ability of those skilled in the art in view of the present disclosure, contains several control mechanisms. Included among the control mechanisms should be a photo sensor relay to set and control the sensitivity of electric eye 30. Also included in the control panel should be a delay timer to set and control the time delay between the time that a lens passes sensor 30 and the time that the airless spray system is actuated. Typically, such delay would be on the order of one second or less, although this will depend on the conveyor speed and the distance between the sensor 30 and location 28. Also included in the control panel should be a second delay timer to control the duration of spray system actuation, that is, the time period during which the liquid antistatic material is being sprayed onto the plastic lenses. As discussed above, an airless spray system is found to provide a more uniform coating and, in addition, a less heavy coating is required in view of the better distribution of liquid antistatic material achieved on the surface of the plastic lens in view of the prior deionization step. Accordingly, such spray duration typically can be approximately one second or less. Suitable commercially available models for each of the aforesaid control devices will be readily apparent to the skilled of the art in view of the present disclosure.

The airless spray system comprises an enclosed reservoir 34 of liquid antistatic material. One suitable material is Staticide (trademark) available from ACL Corp., Elkgrove, Ill. Typically, this material is diluted with deionized water at a ratio of from about 150:01 to about 300:1. The solution is fed by feed line 36 to airless pump means 38. Various suitable pumps are commercially available and will be apparent to the skilled of the art in view of the present disclosure. One such pump is model 64-B Stainless Steel Hydraulic Pump available from Nordson Corp., Amhurst, Ohio. This is a single piston, reciprocating, air driven pump with a 15 to 1 liquid to air pressure ratio. It is designed to supply atomizing pressure to multiple airless spray guns. It can be operated indefinitely in a stall condition without damage and automatically compensates for varying fluid demands and intermittent spray operation. The liquid antistatic solution is pumped from reservoir 34 through a filter (not separately shown) and supply line 42 to fluid Pressure regulator 40. The fluid pressure regulators preferably have dial pressure indicators for purposes of monitoring the operation of the system. Preferably all fluid communication lines, valving, fittings, etc. are corrosion resistant stainless steel or other suitable material. As a general matter, pressure regulating devices, valving, conduit and like components of the system and also wiring and electronic devices described herein are readily commercially available and selection of suitable such devices will be within the ability of those skilled in the art with the aid of the present disclosure.

The liquid antistatic material flows then through supply line 44 to the top and bottom airless spray guns 46 and 48, respectively. Good results can be achieved at fluid pressures of approximately 300 to 325 psi. Frequently, upwardly directed spray guns positioned below the lens will require closer proximity to the lens than upper spray guns, since the spray from the lower guns must overcome gravitational effects. One suitable, commercially available spray gun is Model A7A available from Nordson Corporation. Fluid circulation kit Model 64B and 180C, available from Nordson Corporation, provides other suitable components for the system. Preferably each spray gun is equipped with a cross-cut nozzle having an extremely small orifice diameter. When functioning properly under optimal conditions, these nozzles can disperse a fine mist to coat each lens with an even "mono-layer" of antistatic solution.

When a conveyed lens passes by sensor 30, a signal is sent by the sensor to the trigger delay mechanism mentioned above. After the pre-set delay, the trigger activates a pneumatic valve which then initiates gun spraying. Preferably the lenses are moved continuously past location 28 during actual spraying, coming to rest at location 50, since this is found to substantially improve the uniformity of spray distribution over the surface of the lenses.

It will be understood from this disclosure that any number of spray guns may be used both above and below the lenses. The appropriate number will depend upon whether multiple lenses are being treated simultaneously, the size of the lenses, etc. Usually there will be nothing between the upper spray gun 46 and the lenses. In contrast, however, the upwardly directed spray from lower gun 48 must pass through the conveyor belt. To minimize the interference of the conveyor belt the return track of the belt preferably passes below lower gun 48. It is well within the skill of those in the art in view of the present disclosure to employ, e.g., idler sprockets or the like to arrange such routing of the conveyor belt. It should be understood that reference to applying a coating of liquid antistatic material to the lens means that preferably, but not necessarily, the entire surface of the lens is coated. According to the preferred embodiment of the invention illustrated in the drawing, a return line 52 is provided for circulating the liquid antistatic material back into reservoir 34.

As stated above, while the spray system employed in the invention is airless, pump 38 may be pneumatically driven. Thus air pressure supply line 54 is shown along with air pressure regulators 56 for supplying pneumatic power to pump 38. Supply line 54 typically would be connected to a general in-plant supply of compressed air. Suitable pressure for pump operation will typically be in the range of 30 to 35 psi.

According to the preferred embodiment of the invention illustrated in the drawing, spray guns 46 and 48 are housed within spray chambers 60 and 62, respectively. These chambers serve to at least partially isolate the lenses during and after spraying from airborne contaminants and thus aid in producing a higher quality product. Such chambers can be fashioned, for pxample, of ⅛ inch plexiglass or the like. Clear Plexiglass has the advantage of allowing visual observation of the spray operation, which can aid in the detection and correction of malfunctions, etc. Optional exhaust fan 64 serves to remove excess antistatic material from within the chambers.

The next incremental actuation of the conveyor 16 moves the lenses from location 50 to a location within decay chamber 66. The "decay chamber" is an enclosed space in which the lens can be held in at least partial isolation from airborne contamination and the like while the liquid antistatic coating dries and becomes substantially fully effective. Thus, decay chamber 66 preferably is sufficiently long to house a lens over several incremental advances of the conveyor. The determination of a sufficient time period for substantially complete drying of the antistatic solution will be within the skill of the art. This period is known to be a function of the type and amount of antistatic material used, the relative humidity of ambient air, temperature, grounding and other factors. Decay chamber 66 can be constructed in much the same fashion as the spray chambers 60 and 62 and, hence, preferably comprises thin plexiglass walls or the like. Lenses pass from decay chamber 66 to the end of convey 16 and there are unloaded, either manually or automatically, for storage or further processing, assembly, etc. Reference above to movement of the lenses along the apparatus by conveyor 16 "in substantial synchrony" is intended to mean that parts move through the apparatus one after another at the same pace. This would be the case, for example, where all lenses are conveyed on a common conveyor through the apparatus, as is the case in the preferred embodiment illustrated in the drawing, but a lens may move from one location to another in synchrony (as that term is used herein) with another lens even if one or both move to intermediate locations before reaching the location at which the prior lens was treated.

Emergency switch 70 is conveniently located to allow an operator of apparatus 10 to shut down the conveyor and other operating components of the line when needed. Electrical panel 72 and auxiliary electrical outlet 74 provide electrical power to conveyor 16 and various other components of the line. It will be within the skill of the art to design and position these devices appropriately.

In addition to concentration, other factors, which it will be within the skill of the art to optimize with the aid of this disclosure, include the flow rate at the spray gun, the spray pattern, dispensing pressure, distance between the spray gun and the part, amount of liquid dispensed, dryness of the part surface prior to spraying and the temperature of the lenses being treated.

Plastic lenses treated by the apparatus and process of the present invention are found to be reliably and consistently of high quality, as measured for example by the decay time of the antistatic protection. A suitable test procedure is described in Federal Test Method, Standard No. 101, Method 4046 (1969). Also, the use of static charge meters to measure the surface voltage on plastic lens treated by the invention demonstrates the improved results achieved. Thus, a static charge meter such as the Simco Electrostatic Locator, e.g. models Type SS-2X and Type SS-2, available from Simco Company, Hatfield, Penna., can be used to measure the "electric field" or "electric potential" produced by any static charge on a surface area of the lens.

The foregoing description and discussion of preferred embodiments of the invention is intended to modifications of and additions to the invention will be apparent to the skilled of the art in view of this disclosure and all such modifications and additions are intended to be within the scope of the appended claims.

We claim:

1. An antistatic treatment apparatus for providing antistatic protection to a plastic lens, said apparatus comprising:
   (A) deionizing means for providing a flow of ionized air to at least a first major surface of said lens; and
   (B) coating means for then applying a coating of liquid antistatic material to said lens, said coating means comprising an airless spray system for spraying said liquid antistatic material.

2. The antistatic treatment apparatus of claim 1 further comprising decay chamber means for at least partially isolating said lens from airborne contaminants for a time period sufficient for said coating to at least substantially dry.

3. The antistatic treatment apparatus of claim 1 further comprising conveyor means for conveying said lens through said apparatus.

4. An antistatic treatment apparatus for providing antistatic protection to a plastic lens, said apparatus comprising:
   (A) deionizing means at a first location in said apparatus for providing a flow of ionized air to at least a first major surface of said lens;
   (B) coating means at a second location in said apparatus for applying a coating of liquid antistatic material to said lens after it leaves said first location, said coating means comprising an airless spray system with spray guns for spraying said liquid antistatic material;
   (C) decay chamber means for at least partially isolating said lens from airborne contaminants for a time period sufficient for said coating to at least substantially dry; and
   (D) conveyor means for conveying said lens through said apparatus from said first location to said second location and from there to said decay chamber means.

5. The antistatic treatment apparatus of claim 4 further comprising spray chamber means for at least partially enclosing said second location and said spray guns of said coating means to at least partially isolate the same from airborne contaminants.

6. The antistatic treatment apparatus of claim 4 further comprising sensor means between said first location and said second location for sensing passage thereby of said lens on said conveyer means and for sending a signal in response thereto said coating means to actuate said spray guns.

7. The antistatic treatment apparatus of claim 6 wherein said spray guns are actuated intermittently and said coating means comprises time delay means for delaying actuation of said spray guns a predetermined period of time following said signal from said sensor means.

8. The antistatic treatment apparatus of claim 4 wherein said conveyor means comprises a horizontally disposed conveyor belt of sufficiently open construction to permit substantially complete coating of a downwardly facing surface of said lens by a spray of said liquid antistatic material directed upwardly toward said surface from a said spray gun mounted below said conveyor belt.

9. The antistatic treatment apparatus of claim 8 wherein said conveyor means comprises handling means for picking up said lens from within a molding cavity of an injection molding tool and then orienting and conveying said part to said conveyor belt.

10. An antistatic treatment apparatus for providing antistatic protection to a plastic lens, said apparatus comprising:
    (A) deionizing means at a first location in said apparatus for providing a flow of ionized air directed to at least a first major surface of said lens;
    (B) coating means at a second location in said apparatus for applying a coating of liquid antistatic material to substantially the entire surface of said lens after it leaves said first location, said coating means comprising an airless spray system with multiple spray guns for spraying said liquid antistatic material;
    (C) spray chamber means for at least partially enclosing said second location and said spray guns of said coating means to at least partially isolate the same from airborne contaminants;
    (D) decay chamber means for at least partially isolating said lens from airborne contaminants for a time period sufficient for said coating to at least substantially dry;
    (E) conveyor means for conveying said lens through said apparatus comprising a conveyor belt extending substantially horizontally from said first location to said second location and from there into said decay chamber means; and
    (F) sensor means between said first location and said second location for sensing passage thereby of said lens on said conveyer belt and for sending a signal in response thereto to said coating means to actuate said spray guns, said spray guns being actuated intermittently and said coating means further comprising time delay means for delaying actuation of said spray guns a predetermined period of time following said signal from said sensor means.

11. A process for providing antistatic protection to a plastic lens, said process comprising:
    (A) exposing at least a major surface of said lens to a flow of ionized air; and
    (B) subsequently applying a coating of liquid antistatic material to said lens by an airless spray system.

12. A process for providing antistatic protection to a plastic lens, said process comprising:
    (A) conveying said lens to a first location and there exposing at least a major surface thereof to a directed flow of ionized air; and
    (B) subsequently conveying said lens to a second location and there applying a coating of liquid antistatic material to said lens by an airless spray system.

13. The process of claim 12 further comprising conveying said lens from said second location into a decay chamber in which it is at least partially isolated from airborne contaminants for a time period sufficient for said coating to at least substantially dry.

14. The process of claim 12 wherein said lens is held stationary in said first location for a period of time sufficient to substantially eliminate static charge from said surface thereof.

15. The process of claim 14 wherein said coating is applied to said lens as it is in motion through said second location, said lens thereafter being held stationary at a third location for a period of time substantially equal to said period of time recited in claim 14.

16. The process of claim 12 wherein said process further comprises sensing passage of said lens past a location and sending a signal in response thereto to said coating means to actuate said coating means to apply said coating to said lens at said second location.

17. The process of claim 16 wherein said actuating signal actuates said coating means following a preselected delay during which said lens is conveyed from said mediate location to said second location.

18. The process of claim 12 wherein said lens is conveyed in a step-wise fashion, being held for a period of time sufficient to substantially eliminate static charge from said surface thereof at said first location, said coating being applied as said lens is moved continuously through said second location to a third location at which it is held for a period of time substantially equal to said period of time required for the elimination of static charge from said surface thereof.

19. A process for providing antistatic protection to each in turn of a series of plastic lenses, said process comprising:
(A) conveying a first lens to a first location at which said first lens is held stationary for a period of time sufficient to substantially eliminate static charge from substantially all surfaces thereof while at least a major surface thereof is exposed to a directed flow of ionized air;
(B) subsequently conveying said first lens through a second location to a third location, at which third location said first lens is held stationary for a period of time substantially equal to said period of time recited in step (A), a coating of liquid antistatic material being applied to substantially the entire surface of said first lens by coating means for directing a spray of said liquid antistatic material at said first lens as it passes through said second location, said coating means comprising an airless spray system with multiple spray guns for spraying said liquid antistatic material onto said first lens;
(C) substantially in synchrony with step (B), conveying a second lens to said first location at which said second lens is held stationary for a period of time substantially equal to said period of time recited in step (A) while at least a major surface thereof is exposed to a directed flow of ionized air sufficient during said period of time to substantially eliminate static charge from substantially all surfaces of said second lens; and
(D) then repeating step (B) for said second lens and, substantially in synchrony therewith, conveying said first lens from said third location into a decay chamber in which it is at least partially isolated from airborne contaminants for a time period equal to at least said period of time recited in step (A) and sufficient for said coating to at least substantially dry,
wherein said process further comprises sensing passage of said first and second lens past a location mediate said first location and said second location and sending a signal in response thereto to said coating means to actuate said coating means to apply said coating to said first and second lens at said second location following a preselected delay period during which said lens is conveyed from said mediate location to said second location.

* * * * *